UNITED STATES PATENT OFFICE.

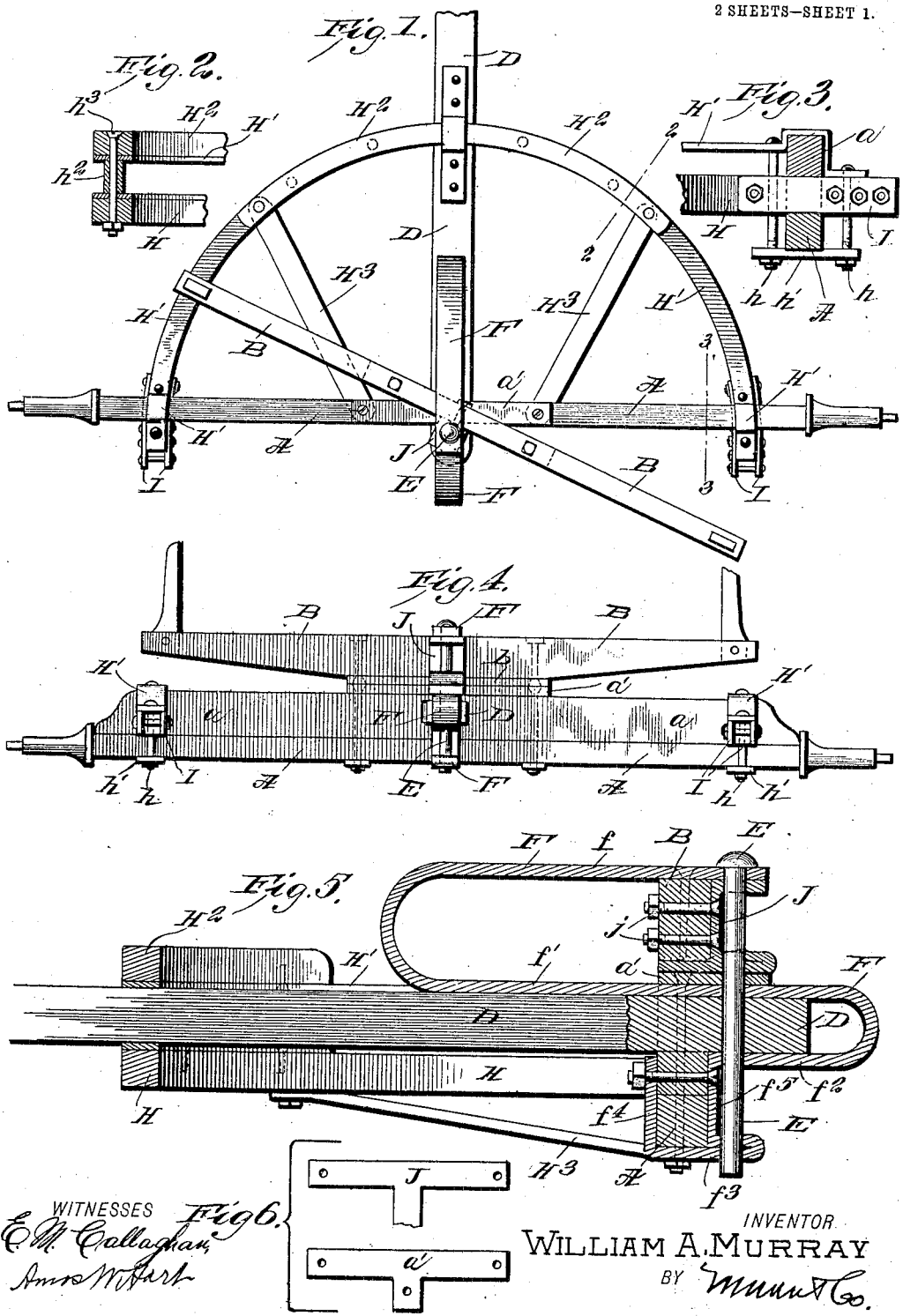

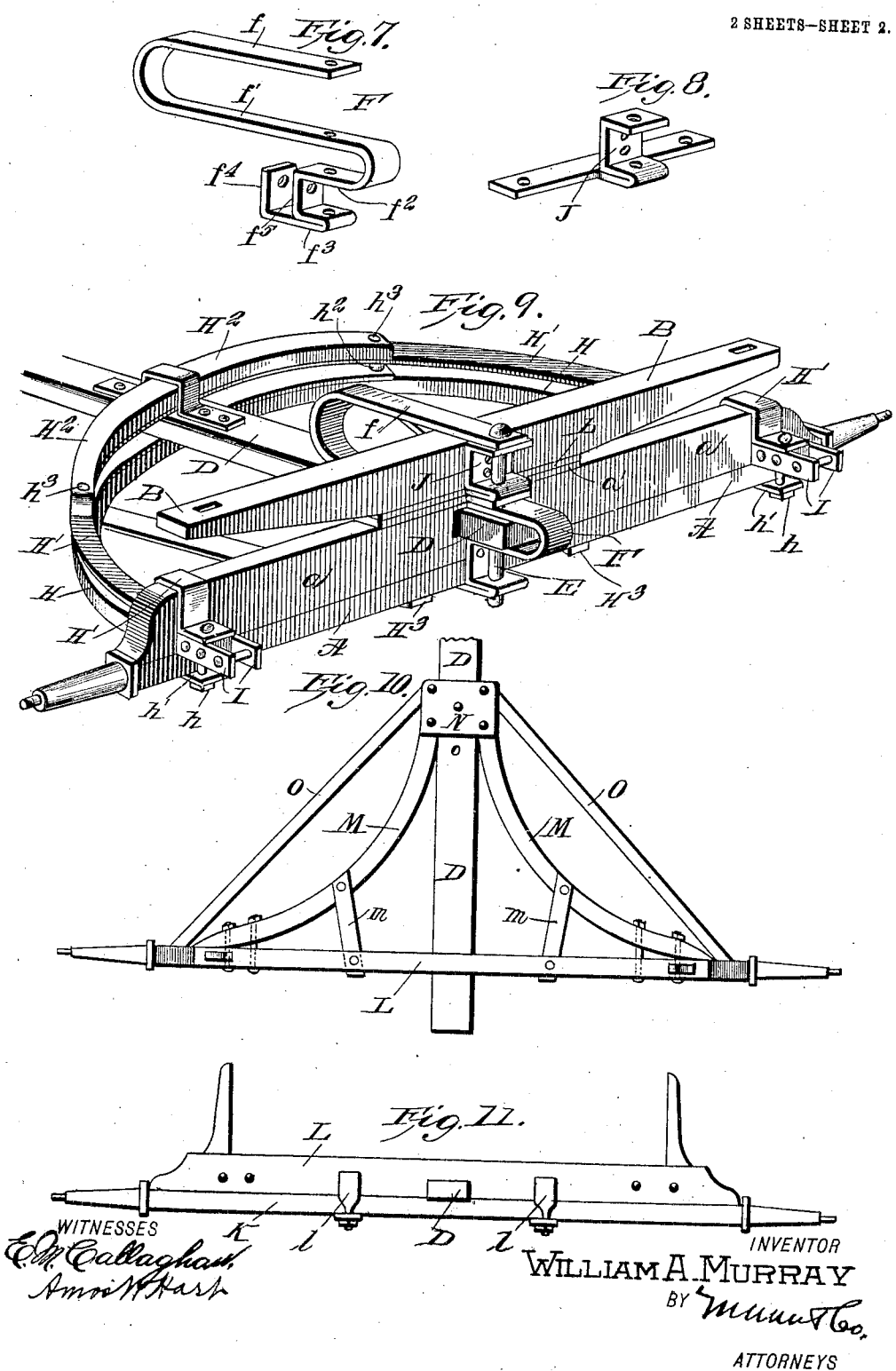

WILLIAM ALBERT MURRAY, OF SANFORD, FLORIDA.

WAGON-GEAR.

No. 852,287.     Specification of Letters Patent.     Patented April 30, 1907.

Application filed November 24, 1906. Serial No. 344,858.

*To all whom it may concern:*

Be it known that I, WILLIAM ALBERT MURRAY, a citizen of the United States, and a resident of Sanford, in the county of Orange and State of Florida, have made an Improvement in Wagon-Gear, of which the following is a specification.

The object of my invention is to provide a wagon gear combining maximum strength and lightness and durability with adaptability for economy in manufacture.

The details of construction, arrangement, and combination of parts embodying my invention are as hereinafter described, and illustrated in the accompanying drawings, in which Figure 1 is a plan view of the front portion of my wagon gear, the bolster being shown at an angle to the axle. Fig. 2 is an enlarged cross section on the line 2—2 of Fig. 1. Fig. 3 is an enlarged cross section on the line 3—3 of Fig. 1. Fig. 4 is a front view of the front axle and bolster connected according to my invention. Fig. 5 is a longitudinal enlarged section of the front portion of a wagon gear. Fig. 6 is a plan view of bolster brace and axle wear plate. Fig. 7 is a perspective view of a reversal curve device for connecting the front axle, the bolster and the reach, by means of a king bolt. Fig. 8 is a perspective view of a brace attached to the front bolster and receiving the king bolt. Fig. 9 is a perspective view of the front portion of the wagon gear. Fig. 10 is a plan view of the rear portion of the wagon gear. Fig. 11 is a rear elevation the rear portion of the wagon gear.

A indicates the front axle having an axlebed $a$ attached thereto; B is the front bolster; and L—see Figs. 10 and 11—the rear bolster upon which a wagon bed (not shown) is to be supported in the usual way. The front axle A is swiveled to the bolster B so as to turn or oscillate thereon in a horizontal plane, in a well known manner. The reach D extends through a slot in the axle piece $a$ attached to axle A, and is provided with a vertical hole to receive the king-bolt E. As a means for receiving the king-bolt and connecting the front axle and bolster, I employ the device F shown detached in Fig. 7. The same is formed of a stout metal strap having five bends or curves. Thus the upper arm $f$ extends forward over the central or body portion $f'$, while the latter is curved rearward to form the shorter arm $f^2$, and the lower portion of the device is reversely curved or bent upon itself at $f^3$, and again upward at $f^4$ to form a flange or lip. Coincident holes are formed in the parts $f$, $f'$, $f^2$, and $f^3$, through all of which the king-bolt E passes when the device is applied as shown in Figs. 1, 4, 5 and 9. Thus the bolster B is arranged between the front portions of the parts $f$, $f'$, and secured to the upper one by a bolt indicated in dotted lines Fig. 5. The reach D is inserted and arranged in the loop or space between the parallel parts $f'$ and $f^2$, and the axle A, together with the axle bed $a$ is embraced by the flange $f^4$ and the opposing vertical part $f^5$—see Fig. 7. A screw bolt $f^6$—see Fig. 5—passes through the parts $f^4$, $f^5$, and also through the intervening axle-bed $a$.

The lower part or semicircle H of the fifth wheel, is constructed of wood and its ends project through slots in the axle-bed $a$, as shown in several figures—see especially Figs. 1, 3, and 9. The upper half-circle H' is formed of a metal plate or strap, and, as shown in Figs. 1, 3 and 9, this strap passes over the axle-bed $a$, it being bent so as to embrace the side edges thereof, and its front end rests upon the portion of the lower circle bar H which extends beyond the axle-bed. Bolts $h$ pass through the strap H' and through a bar $h'$—see Fig. 3—the whole constituting a clip whereby the parts are held firmly together. The shaft or tongue clips I are secured to the forwardly projecting ends of the lower circle bar H, and the same consist of parallel horizontal bars bolted to opposite sides of the part H. A short wooden bar $H^2$ is bolted to the upper circle bar H' and passes over the reach D, and is spaced from the lower bar H by means of thimbles or sleeves $h^2$—see Fig. 2—through which pass bolts $h^3$. The same bolts $h^3$ secure the outer ends of diagonal braces $H^3$—see Fig 1—which extend, and are bolted, to the under side of the axle A. A supplemental brace J—see Figs. 5, 8 and 9—is arranged between the upper member $f$ and the middle member $f'$ of the combined coupling and brace F, and it is secured to the bolster B by bolts $j$. Its parallel ears or flanges are provided with holes to receive the king-bolt E. The lower ear or flange rests upon the forwardly projecting middle portion of the wear plate $a'$ shown in plan in Fig. 6, and is extended rearward and forms a wear plate for the bolster which rests on axle wear plate $a'$.

Referring now to Figs. 10 and 11, K indicates the rear axle, and L the wooden piece or bed which is secured thereon by means of clips $l$. The rear hounds M are curved inward, their forward ends lying practically parallel to the reach D, while their rear ends are bent outward alongside the axle K. Intermediately of their ends, these hounds are connected with the axle by means of tie bars $m$. The forward ends are bolted to plates N, which are in turn bolted to the reach D, but adapted for adjustment on the same. The diagonal braces O extend from the piece N to the rear axle at points adjacent to the journals of the same. By constructing the hounds in the manner described, draft and other strains are applied to the axle at various points throughout its length, so that a smaller and lighter axle may be employed than is usual in this class of wagon gear.

I claim:

1. The combination, with the front axle, the bolster and reach, of the coupling device and brace F having four reverse curves, the top portion extending over the bolster, the body or central portion formed as a loop that receives the reach, and the lower part embracing the front and rear sides of the axle, and a king-bolt passing through coincident holes in all the parts or members of the device save the rear flange, and also through the reach, as shown and described.

2. The combination, with the front axle, the bolster and the reach, of the reverse-curve coupling device and brace, the bolster being arranged in the space between the two upper members, the axle being engaged by the flanges of the lower part of the device, the reach extending into the space between the middle members, a supplemental brace J having parallel horizontal flanges and bolted to the front side of the bolster, and a king-bolt passing, on the front side of the axle, through such supplemental brace, the combined coupling and brace, and the reach, substantially as described.

3. The combination, with a front axle, bolster and reach, of a coupling comprising a metal strap or piece, having a rearwardly extending curve in which the bolster is arranged, a forwardly extending curve into which the reach extends, and a lower or bottom portion which embraces the axle, and a king-bolt passing through members of the coupling and the reach in front of the bolster and axle, substantially as described.

4. In a wagon gear, the improved coupling and brace formed of a metal strap having a series of reverse curves, and intervening parallel portions which are spaced apart to adapt them to receive the bolster, the reach, and the axle in the manner described.

5. In a wagon gear, the combination, with a front axle, the axle-bed, and the reach passing through said bed, of the combined brace and coupling having a forwardly extended loop, whose lower portion extends forward and is formed as a return or front loop whose end portion is provided with vertical flanges $f^4 f^5$, spaced apart to embrace the front and rear sides of the axle and bed, and a king bolt passing through the reach and the portions of the coupling in front of the axle, as described.

WILLIAM ALBERT MURRAY.

Witnesses:
R. H. MARKS,
C. W. GOODRICH.